Nov. 11, 1924.
J. P. HEIL ET AL
1,515,111
TRUCK TANK BUMPER
Filed Feb. 9, 1923
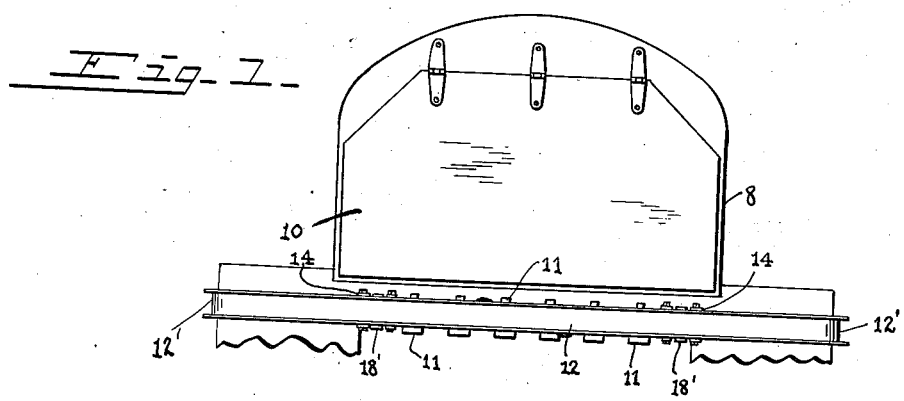
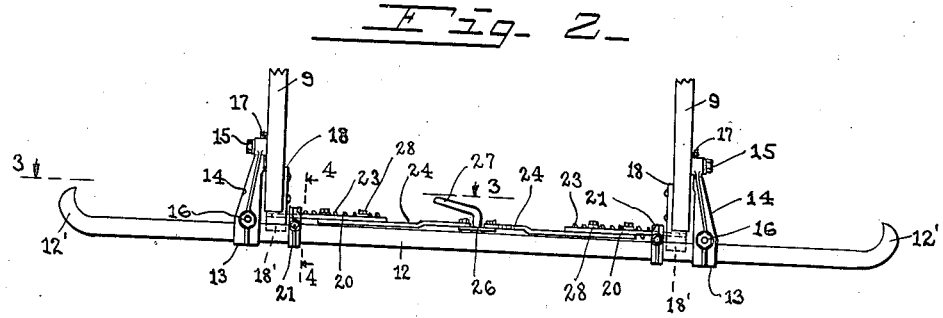
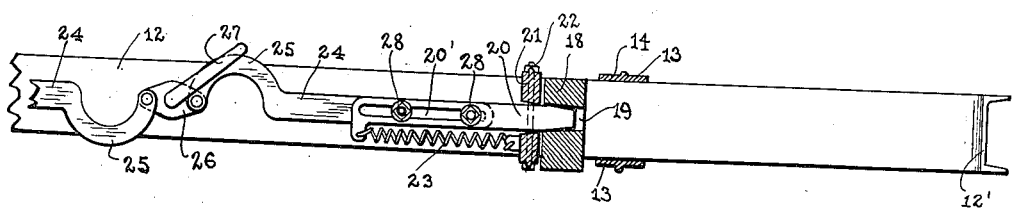
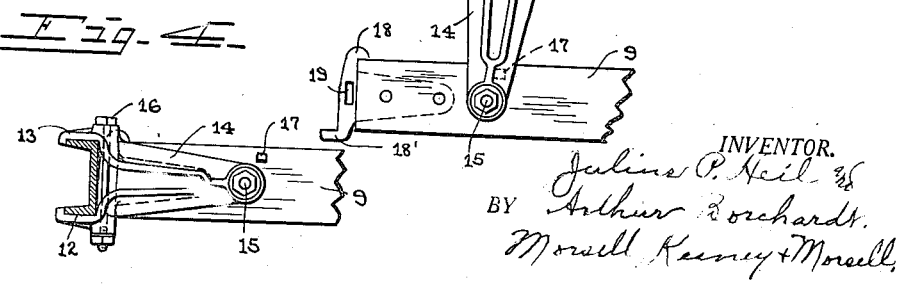
INVENTOR.
Julius P. Heil
BY Arthur Borchardt
Morsell Keeney & Morsell
ATTORNEYS Patented Nov. 11, 1924.

1,515,111

UNITED STATES PATENT OFFICE.

JULIUS P. HEIL AND ARTHUR BORCHARDT, OF MILWAUKEE, WISCONSIN.

TRUCK-TANK BUMPER.

Application filed February 9, 1923. Serial No. 618,166.

*To all whom it may concern:*

Be it known that we, JULIUS P. HEIL and ARTHUR BORCHARDT, citizens of the United States, and residents of Milwaukee, in the county of Milwaukee and State of Wisconsin, have invented new and useful Improvements in Truck-Tank Bumpers, of which the following is a description, reference being had to the accompanying drawings, which are a part of this specification.

This invention relates to improvements in truck tank bumpers.

Truck tanks for dispensing oil, gasoline, etc., are usually provided with faucets at their rear ends for discharging the contents from the different compartments of the tank. It is desirable to provide a bumper at the rear end of the truck to protect the faucets and to also protect the dispensing cans which are usually carried in a small campartment at the rear of the tank. An ordinary fixed bumper mounted to protect the faucets interferes with the use thereof, and is therefore not desirable.

It is one of the objects of the present invention to overcome the before mentioned objectionable features and provide a truck tank bumper which while normally in a faucet protecting position may be easily swung to a position to permit the free use of the faucets.

A further object of the invention is to provide a truck tank bumper in which the bumper will be automatically locked when swung to its normal position of use.

A further object of the invention is to provide a truck tank bumper which is adapted to be reinforced by portions of the truck to which it is attached.

A further object of the invention is to provide a truck tank bumper which is of simple construction, is strong and durable, and is well adapted for the purpose described.

With the above and other objects in view, the invention consists of the improved truck tank bumper and its parts and combinations as set forth in the claims, and all equivalents thereof.

In the acompanying drawing, in which the same reference characters indicate the same parts in all of the views:

Fig. 1 is a rear end view of a portion of a truck tank provided with the improved bumper;

Fig. 2 is a top view of the bumper and portions of the truck;

Fig. 3 is a sectional detail view on a larger scale taken on line 3—3 of Fig. 2, showing the locking means in open position;

Fig. 4 is a transverse sectional detail view taken on line 4—4 of Fig. 2 showing the bumper in its lower position; and Fig. 5 is a similar view showing the bumper in its upper position.

Referring to the drawing, the numeral 8 indicates the rear end portion of a tank truck and 9 the opposite side frame members thereof. The truck tank is provided with a rear measuring receptacle compartment closed by a door 10, and faucets 11 positioned therebeneath. The improved bumper member 12 is formed of a length of commercial steel of channel shape in cross section and having its opposite end portions 12' curved forwardly. The channel portion of the bumper member extends rearwardly, and said member is clamped between the jaws 13 of bifurcated lever arms 14 which are pivotally connected at their inner ends to the outer side portions of the side members 9 by pivot bolts 15.

Bolts 16 extending through the jaws 13 draw the said jaws into clamping engagement with the bumper member 12. As thus pivoted, the bumper bar may be swung downwardly to the position shown in Fig. 4, or upwardly to the non-protecting position shown in Fig. 5. Stop bolts 17 limit the upward movement of the bumper member while bracket members 18 having outwardly projecting shoulders 18' limit the downward movement of said bumper member and maintain said bumper member in horizontal position. The brackets 18 which are bolted to the inner sides of the side frame members 9 are provided with elongated openings or slots 19 for receiving bolts 20 slidably carried by the bumper member 12. The said bolts are slidably mounted in guide brackets 21 of bifurcated form which are adjustably attached to the bumper member 12 by clamping screws 22 which extend through the bifurcated portions of said guide brackets. Coiled springs 23 connected to the bolts 20 and the guide brackets 21 normally hold the bolts in their outer locking position. Said bolts adjustably carry inner extensions 24 having inner semi-circular end portions 25 reversely curved with relation to each other and pivotally connected to a rocking member 26 so that when said rocking member is turned a half revolution the ends of the extensions will overlap each other and lock in open position. A handle 27 extends upwardly from the rock member 26 for convenience in turning the same. The bolts 20 are provided with slots 20' and the extensions 24 are connected to the slotted portions by bolts 28 to permit adjustment thereof.

When in horizontal position the bumper bar will bear against the brackets 18 and as said brackets bear against the end portions of the frame side members 9, said bumper will be reinforced by said side members.

In use, the bumper will normally rest in horizontal position to protect the rear end portion of the truck, and when it is desired to draw liquid from the tank compartments, it is only necessary to unlock the bolts and swing the bumper upwardly to permit free access to the faucets. When the bumper is in its lower position and locked, the bolts cannot accidentally unlock due to the alined position of the pivotal connections between the bolt extension and the rock member.

From the foregoing description, it will be seen that the truck tank bumper is of very simple construction, and is well adapted for the purpose described.

What we claim as our invention is:

1. A truck tank bumper, comprising a truck frame, a bracket connected thereto, arms pivotally connected directly to the frame in spaced relation, a bumper member carried by the outer end portions of the arms and having two positions of rest, and a locking means carried by the bumper member and engaging the bracket when in locked position.

2. A truck tank bumper, comprising a truck frame, bracket members connected thereto, arms pivotally connected directly to the frame member in spaced relation, a bumper member carried by the outer end portions of the pivoted arms and having two positions of rest, locking members carried by the bumper member for locking engagement with the bracket members, and means for actuating the locking members.

3. A truck tank bumper, comprising a truck frame, bracket members projecting rearwardly from said frame and having locking recesses, arms pivotally connected directly to the frame member in spaced relation, a bumper member carried by the outer end portions of the pivoted arms and having with said arms two positions of rest, locking members carried by the bumper member for locking engagement with the locking recesses, and means for actuating the locking members.

4. A truck tank bumper, comprising rearwardly projecting truck frame members, jawed arms pivotedly connected to said frame members and movable from a horizontal position to an upright position, a bumper member clamped between the jaws of the jawed arms and movable therewith, bracket members projecting rearwardly from the frame members and having shouldered portions which support the bumper member when in its lower position, said bracket members also having locking recesses, locking bolts carried by the bumper member and entering the locking recesses, springs for normally holding the bolts in locked position, and a lever member fulcrumed on the bumper member for actuating the bolts.

5. A truck tank bumper, comprising rearwardly projecting truck frame members, jawed arms pivotedly connected to said frame members and movable from a horizontal position to an upright position, a bumper member clamped between the jaws of the jawed arms and movable therewith, bracket members projecting rearwardly from the frame members and having shouldered portions which support the bumper member when in its lower position, said bracket members also having locking recesses, two part adjustable locking bolts slidably carried by the bumper member and entering the locking recesses, the adjacent inner end portions of the locking bolts being reversely curved with relation to each other, and a lever member fulcrumed on the bumper member and pivotally connected to the curved portions of the locking bolts for actuating said locking bolts and holding them in unlocked overlapped position.

In testimony whereof, we affix our signatures.

JULIUS P. HEIL.
ARTHUR BORCHARDT.